3,769,321
PROCESS FOR PREPARING ARYL
HYDROXYBENZOATE
Toshio Kato, Omiya, and Kenji Yoshimura, Tokyo, Japan, assignors to Asahi Kasei Kogyo Kabushiki Kaisha, Osaka, Japan
No Drawing. Filed Dec. 17, 1971, Ser. No. 209,432
Claims priority, application Japan, Dec. 17, 1970, 45/112,492; Oct. 18, 1971, 46/81,570
Int. Cl. C07c 69/88
U.S. Cl. 260—473 S          7 Claims

ABSTRACT OF THE DISCLOSURE

Aryl hydroxybenzate represented by the formula,

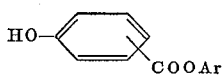

wherein Ar is an unsubstituted or substituted aryl radical, is prepared by reacting an acyloxybenzoic acid represented by the formula,

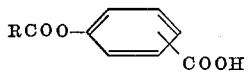

wherein R is an alkyl group having 1 to 5 carbon atoms, with a hydroxyaryl compound represented by the formula, Ar—OH, in the presence of an esterification catalyst at a temperature of 100°–260° C.

---

This invention relates to a process for preparing an aryl hydroxybenzoate.

More particularly, the present invention relates to a process for preparing an aryl hydroxybenzoate represented by the formula,

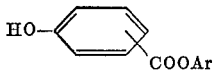  (I)

wherein Ar is an unsubstituted or substituted aryl radical, which comprises reacting an acyloxybenzoic acid represented by the formula,

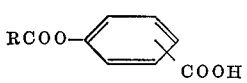  (II)

wherein R is an alkyl group having 1 to 5 carbon atoms, with a hydroxyaryl compound represented by the formula, Ar—OH          (III)

wherein Ar is as defined above, in the presence of an esterification actalyst at a temperature of 100–260° C.

The aryl hydroxybenzoate is an important compound as a starting material for preparing polymers such as polyoxybenzoyl.

It has already been proposed to prepare aryl hydroxybenzoates by reacting a hydroxybenzoic acid with a phenol in the presence of a large amount of dehydrating agent. (J. Am. Chem. Soc. 75, 5416 (1953)). There are, however, numerous disadvantages inherent to the process, such as the use of expensive dehydrating agent, the difficulty and complication in isolating and purifying the desired product, and the like. U.S. Pat. No. 3,039,994 discloses a process for preparing an aryl o-hydroxybenzoate by the ester-interchange between hydroxybenzoic acid and phenyl acetate, but in case of the preparation of phenyl p-hydroxybenzoate the selectivity and yield of the desired product are extremely low. None of these processes are suitable for a commercial-scale production.

An object of the present invention is to provide a process for preparing an aryl hydroxybenzoate in good yield by a commercial-scale production. Another object of the present invention is to provide a process for preparing an aryl hydroxybenzoate using an acylate of hydroxybenzoic acid as a starting material.

The reaction according to the process of the present invention may be illustrated by the following reaction scheme:

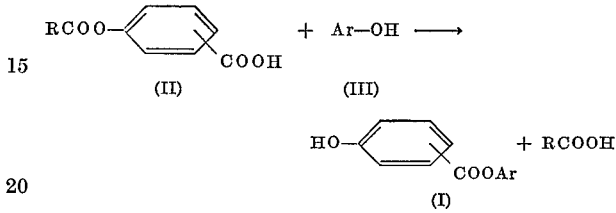

The acyloxybenzoic acid represented by the Formula II and the hydroxyaryl compound represented by the Formula III are used as starting materials to give ultimately the aryl hydroxybenzoate represented by the Formula I and an aliphatic carboxylic acid. In fact, many side reactions other than the reaction mentioned above may take place at the same time, but in the process of the present invention the acyloxy group in the starting material of the Formula II may take part in the reactions to allow the reaction process favorably for giving ultimately the desired product in good yield.

The acyloxybenzoic acid represented by the Formula II used as a starting material, is a hydroxybenzoic acid ester with a fatty acid having an alkyl group containing 1 to 5 carbon atoms such as para-acetoxybenzoic acid, para-propionoxybenzoic acid, meta-butyroxybenzoic acid, ortho-acetoxybenzoic acid and the like. These acyloxybenzoic acids are easily prepared by a conventional process, for example, acylating an hydroxybenzoic acid with aliphatic carboxylic acid anhydride in which alkyl moiety has 1 to 5 carbon atoms or by oxydizing an acylate of cresol (German patent application No. 1,947,644 (1970)).

The hydroxyaryl compounds represented by the Formula III include, for example, phenol, para-chlorophenol, para- or meta-cresol, and methoxyphenol. These phenols may be used in a proportion of 2 moles or more, preferably from 2.5 to 8 moles per mole of the acyloxybenzoic acid represented by the Formula II.

It is preferable to distill off, during the reaction, an organic acid formed as a by-product from the reaction system with a flow of an inert gas introduced so as to increase the yield of the desired aryl hydroxybenzoate. As the inert gas, nitrogen, helium, argon, and hydrogen may be used. Vapors of inert solvents such as toluene, xylene may also be used for distilling off the organic acid formed.

The reaction temperatures employed in the present process are within the range of 100 to 260° C., preferably 150 to 220° C. When the reaction temperature is below 100° C., the yield of the desired product is extremely low. On the other hand, when a temperature higher than 260° C. is employed, various undesirable side-reactions take place and the yield of the desired product is lowered.

In the process of the present invention, the desired product is hardly obtained without using a catalyst. As the catalyst, conventional esterification catalysts or ester-interchange catalysts may be employed. As the preferable catalysts, acidic catalyst of strong acid such as sulfuric acid, phosphoric acid, para- toluenesulfonic acid and the like or Friedel-Crafts type catalyst such as trifluoroboron are employed. There are also employed effectively tetrabutyl titanate, titanium sulfate, manganese acetate, calcium acetate, stannous acetate, and zinc acetate. The catalyst is employed in an amount of 0.1 to 5% by weight based on the total weight of the starting materials.

The process of the present invention may be carried out either batchwise or continuously. In case of a batchwise reaction, since there are hardly produced useless by-products, compounds other than the desired product may be reused in the process of the present invention or in the preparation of the starting materials of the present invention.

According to the process of the present invention, the aryl hydroxybenzoate represented by the Formula I can be obtained with higher selectivity in a commercial scale production than any known processes.

In the following examples, the products obtained are analyzed by means of gas chromatograph 3AF-type, made by Shimazu Seisakusho Co., Ltd., under the following conditions: column, OV-17; column temperature, 180° C.; carrier gas, nitrogen.

EXAMPLE 1

Into a glass ampule 0.01 mole of para-acetoxybenzoic acid 0.01 mole of phenol, 1.0 g. of para-xylene and 1.9 mg. of para-toluenesulfonic were charged and reacted at 150° C. for 2 hours. After cooling, the reaction mixture was taken off and analyzed by gas chromatography. The result obtained are as shown in Table 1.

TABLE 1

| Compound: | Composition Percent |
| --- | --- |
| Phenyl para-hydroxybenzoate | 15.0 |
| Phenyl para-acetoxybenzoate | 3.0 |
| Para-acetoxybenzoic acid | 30.7 |
| Para-hydroxybenzoic acid | 48.3 |

Mass balance based on the para-acetoxybenzoic acid was 97.0%. The yield of phenyl para-hydroxybenzoate was 15.0%.

EXAMPLE 2

Into a glass ampule, 1.8 g. of para-acetoxybenzoic acid, 0.94 g. of phenol, 1.0 g. of cyclohexane, 0.0125 g. of tetrabutyl titanate were charged and reacted at 150° C. for 5 hours. After cooling, the reaction mixture was taken off and analyzed. The result was as shown in Table 2.

TABLE 2

| Compound: | Composition Percent |
| --- | --- |
| Phenyl para-hydroxybenzoate | 20.8 |
| Phenyl para-acetoxybenzoate | 7.8 |
| Para-hydroxybenzoic acid | 57.9 |
| Para-acetoxybenzoic acid | 13.6 |

Mass balance based on the para-acetoxybenzoic acid was 100.1%. The yield of phenyl para-hydroxybenzoate was 20.8%.

EXAMPLE 3

Into a mixture of 36.0 g. of para-acetoxybenzoic acid, 37.6 g. of phenol and 38 mg. of para-toluenesulfonic acid, heated to 150° C., was added dropwise toluene at a rate of maintaining the inner temperature at 150° C., with stirring. The produced acetic acid was distilled off with toluene out of the reaction system. After 5 hours' reaction, 120 g. of distillate was obtained.

The reaction mixture had the composition as shown in Table 3.

TABLE 3

| Compound: | Composition Percent |
| --- | --- |
| Phenyl para-hydroxybenzoate | 59.8 |
| Phenyl para-acetoxybenzoate | 1.0 |
| Para-hydroxybenzoic acid | 39.1 |
| Para-acetoxybenzoic acid | 3.0 |

Mass balance based on the para-acetoxybenzoic acid was 102.9%. The yield of phenyl para-hydroxybenzoate was 59.8%.

EXAMPLE 4

A mixture of 180 g. of para-acetoxybenzoic acid, 188 g. of phenol and 190 mg. of para-toluenesulfonic acid was heated to 150° C. To the mixture was added toluene dropwise at a rate of maintaining the inner temperature at 150° C. with stirring and the produced acetic acid was distilled off with toluene out of the reaction system. After 6 hours' reaction, about 300 ml. of distillate was obtained. The distillate contained 43.8 g. of acetic acid, 11.6 g. of phenol and 8.2 g. of phenyl acetate.

The reaction mixture was diluted with benzene and heated. The insoluble para-hydroxybenzoic acid was separated from the solution by filtration. The filtrate was neutralized with 5% $Na_2CO_3$ solution to pH 6.5 and then fractionated. The solid containing phenol obtained after distilling off the solvent from the organic layer was washed twice with a small amount of toluene. The residue was recrystalized from toluene to give 100.5 g. of white crystals having a melting point of 176–178° C. in a 47% yield.

The neutralized solution was acidified with 10% HCl solution to pH 1.5 and the deposited para-hydroxybenzoic acid was separated. The thus obtained para-hydroxybenzoic acid and that obtained by filtration previously, amount of 23.5 g. after drying. This may be reused in the preparation of the starting material.

EXAMPLE 5

A mixture of 36.0 g. of para-acetoxybenzoic acid, 37.6 g. of phenol and 28 mg. of titanium sulfate was heated to 150° C. To the mixture was added toluene dropwise at a rate of maintaining the inner temperature at 150° C. with stirring and the produced acetic acid was distilled azeotropically with toluene. The distillate contained 7.7 g. of acetic acid, 0.69 g. of phenyl acetate and 2.87 g. of phenol. The reaction mixture was treated as described in Example 4 to obtain 18.3 g. of phenyl para-hydroxybenzoate in a 43% yield. The recovered para-hydroxybenzoic acid was 34.1 (recovering rate 16%).

EXAMPLE 6

A mixture of 50 millimole of para-acetoxybenzoic acid, 200 millimole of phenol and 0.1 g. of tetrabutyl titanate was reacted at 185° C. for 5 hours with passing nitrogen therethrough at a flow rate of 50 ml./min. The produced acetic acid was distilled off out of the reaction system with the lapse of time.

After the reaction, the reaction mixture contained 94.6% of phenyl para-hydroxybenzoate and 4.5% of para-hydroxybenzoic acid.

EXAMPLE 7

A mixture of 50 millimole of meta-acetoxybenzoic acid, 200 millimole of para-cresol and 0.1 g. of tetrabutyl titanate was reacted at 190° C. for 5 hours with passing nitrogen therethrough at a flow rate of 50–60 ml./min. The produced acetic acid was distilled off out of the reaction system with the lapse of time.

After the reaction, the reaction mixture contained 92.8% of cresyl meta-hydroxybenzoate and 3.9% of meta-hydroxybenzoic acid.

EXAMPLE 8

Para-acetoxybenzoic acid (50 millimole) was reacted with 200 millimole of phenol in the presence of 0.1 g. of tetrabutyl titanate at 150–155° C. with passing nitrogen therethrough at a flow rate of 50 ml./min. The produced actic acid was distilled off out of the reaction system with the lapse of time. The each composition of the reaction mixture after 11 and 21 hours is as shown in Table 4.

TABLE 4

| Compound | Reaction time, percent | |
|---|---|---|
| | 11 hrs. | 21 hrs. |
| Para-hydroxybenzoic acid | 13.8 | 8.1 |
| Para-acetoxybenzoic acid | 1.2 | 0.2 |
| Phenyl para-hydroxybenzoate | 78.2 | 88.5 |

EXAMPLE 9

Para-hydroxybenzoic acid (0.1 mole) was reacted with 0.12 mole of acetic anhydride in 140 g. of benzene on the water bath at 80–90° C. for 3 hours. Then, the solvent, unreacted acetic anhydride and produced acetic acid were distilled off under reduced pressure. To the residue were added 0.4 mole of phenol and 0.1 g. of tetrabutyl titanate and the mixture was reacted at 185° C. for 5 hours with passing nitrogen therethrough.

The reaction mixture obtained had the composition as shown in Table 5.

TABLE 5

| Compound: | Composition (percent) |
|---|---|
| Para-hydroxybenzoic acid | 2.2 |
| Para-acetoxybenzoic acid | 6.5 |
| Phenyl para-hydroxybenzoate | 80.3 |
| Phenyl para-acetoxybenzoate | 1.8 |

What is claimed is:

1. A process for preparing an aryl hydroxybenzoate represented by the formula,

wherein Ar is an unsubstituted or substituted aryl radical, which comprises reacting an acyloxybenzoic acid represented by the formula,

wherein R is an alkyl group having 1 to 5 carbon atoms, with a hydroxyaryl compound represented by the formula,

wherein Ar is as defined above, in the presence of an esterification catalyst at a temperature of 100 to 260° C.

2. A process according to claim 1, wherein the hydroxyaryl compound is employed in a proportion of 2 moles or more per mole of the acyloxybenzoic acid.

3. A process according to claim 1, wherein the reaction is carried out while distilling off an organic acid formed out of the reaction system with an inert gas with the lapse of time.

4. A process according to claim 1, wherein the reaction temperature is 150 to 220° C.

5. A process according to claim 1, wherein the hydroxyaryl compound is reacted in a proportion of 2.5 to 8 moles per mole of the acyloxybenzoic acid.

6. A process according to claim 1, wherein the acyloxybenzoic acid is para-acetoxybenzoic acid, para-propionoxybenzoic acid or meta-butyroxybenzoic acid.

7. A process according to claim 1, wherein the hydroxyaryl compound is phenol, para-cresol, metal-cresol, para-chlorophenol, or methoxyphenol.

References Cited

UNITED STATES PATENTS

| | | | |
|---|---|---|---|
| 2,964,497 | 12/1960 | Kibler et al. | 260—473 R |
| 3,270,046 | 8/1966 | Keeler | 260—474 |
| 3,328,439 | 6/1967 | Hamilton | 260—474 |
| 3,549,593 | 12/1970 | Takekoshi | 260—473 R |
| 3,039,994 | 6/1962 | Gleim | 260—47 C |

OTHER REFERENCES

Bader et al., J. Am. Chem. Soc. 75, 5416 (1953).

LORRAINE A. WEINBERGER, Primary Examiner

J. F. TERAPANE, Assistant Examiner

U.S. Cl. X.R.

260—474